United States Patent
Spratt

(10) Patent No.: US 10,928,655 B2
(45) Date of Patent: Feb. 23, 2021

(54) REDUCED DISTORTION SPECTACLE LENS

(71) Applicant: Carl Zeiss Vision International GmbH, Aalen (DE)

(72) Inventor: Ray Steven Spratt, Petaluma, CA (US)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/380,827

(22) Filed: Apr. 10, 2019

(65) Prior Publication Data

US 2019/0235280 A1    Aug. 1, 2019

Related U.S. Application Data

(63) Continuation of application No. PCT/US2017/056618, filed on Oct. 13, 2017, which
(Continued)

(51) Int. Cl.
*G02C 7/06*    (2006.01)
*G02C 7/02*    (2006.01)

(52) U.S. Cl.
CPC .......... *G02C 7/068* (2013.01); *G02C 7/027* (2013.01); *G02C 2202/08* (2013.01)

(58) Field of Classification Search
CPC .......... G02C 7/02; G02C 7/027; G02C 7/068; G02C 2202/08
(Continued)

(56) References Cited

U.S. PATENT DOCUMENTS 3,960,442 A    6/1976   Davis et al.
6,142,624 A    11/2000  Morris et al.
(Continued)

FOREIGN PATENT DOCUMENTS

EP    1031063 A1    8/2000
EP    2246729 A1    11/2010
(Continued)

OTHER PUBLICATIONS

Meister, Darryl, and James Sheedy. Introduction to Ophthalmic Optics. Carl Zeiss Vision, 2010.*
(Continued)

*Primary Examiner* — Zachary W Wilkes
(74) *Attorney, Agent, or Firm* — Thrive IP®; Georg M. Hasselmann

(57) ABSTRACT

A series of spectacle lenses is disclosed, wherein each lens has a spherical front surface and an aspheric, atoric, or freeform back surface. Further, each lens of the series provides a focal power $P_x$ between −6 D and +4 D; and at least one lens of the series provides a focal power $P_x$ between at least one of (a) −0.75 D and +2.25 D and (b) −0.5 D and +2.00 D. For an upper range of focal powers, lenses having the same nominal front surface power are provided; and for a lower range of trough powers, lenses having the same minimum nominal back surface power are provided. The spherical front surface has a nominal front surface power $P_f$ and the back surface has a minimum nominal back surface power $P_b$; wherein $15.5\ D \leq |P_f| + |P_b| + |P_x| \leq 31.5\ D$ applies for each spectacle lens of the series.

7 Claims, 5 Drawing Sheets

Related U.S. Application Data is a continuation of application No. PCT/US2016/057127, filed on Oct. 14, 2016.

(58) Field of Classification Search
USPC .................................... 351/159.75, 159.42
See application file for complete search history.

(56) References Cited

U.S. PATENT DOCUMENTS

| | | |
|---|---|---|
| 6,334,681 B1 | 1/2002 | Perrott et al. |
| 6,454,408 B1 | 9/2002 | Morris et al. |
| 6,698,884 B2 | 3/2004 | Perrott et al. |
| 6,789,896 B2 | 9/2004 | Morris et al. |
| 8,313,194 B2 * | 11/2012 | Colas ............... G02C 7/02 351/159.73 |
| 8,870,375 B2 | 10/2014 | Petignaud et al. |
| 2002/0149739 A1 | 10/2002 | Perrott et al. |
| 2003/0086055 A1 | 5/2003 | Morris et al. |
| 2003/0169397 A1 | 9/2003 | Reichow et al. |
| 2012/0188504 A1 | 7/2012 | Petignaud et al. |

FOREIGN PATENT DOCUMENTS

| | | |
|---|---|---|
| WO | 9848315 A1 | 10/1998 |
| WO | 9963392 A1 | 12/1999 |
| WO | 2013081592 A1 | 6/2013 |

OTHER PUBLICATIONS

Ophthalmic optics—Spectacle lenses—Vocabulary (ISO 13666:2012); German and English version EN ISO 13666:2012, Oct. 2013.

International Search Report and Written Opinion for PCT/US2017/056618, to which this application claims priority, dated Jan. 30, 2018.

International Preliminary Report on Patentability for PCT/US2017/056618, to which this application claims priority, dated Oct. 5, 2018.

\* cited by examiner

REDUCED DISTORTION SPECTACLE LENS

CROSS REFERENCE TO RELATED APPLICATIONS

This application is a continuation application of international application PCT/US2017/056618, filed Oct. 13, 2017, which claims priority to international patent application PCT/US2016/057127 filed Oct. 14, 2016, both of which are hereby incorporated by reference in their entireties.

TECHNICAL FIELD

The present disclosure relates to a series of spectacle lenses. Further, a method for designing a spectacle lens, eyeglasses, a spectacle lens, a method for manufacturing a spectacle lens, and a computer program product are provided.

BACKGROUND OF THE DISCLOSURE

Conventional lens design teaches that the front surfaces of spherical lenses must follow Tscherning's ellipse to produce high quality lenses.

Tscherning's ellipse describes a relationship between the front surface curvature and focal power. First described nearly 100 years ago, it attempts to identify combinations of lens curvature and focal power which have minimum aberration. The general form of the Tscherning ellipse is shown in FIG. 1 for assumed typical values of lens parameters such as index of refraction, vertex distance, lens thickness, etc. The horizontal axis denotes the focal power $P_x$ in diopters [D], whereas the vertical axis denotes the base curve or front surface power $P_f$ in diopters [D].

For each focal power there are two front curves or corresponding front surface powers which provide good optics, locally optimal. The lower portion 2 of the ellipse 1 is the so-called "Ostwalt section," which describes a selection of relatively flat front surfaces. The upper portion 3 of the curve is the so-called the "Wollaston section," which describes much more steeply curved lenses. However, such steeply curved lenses have never gained much acceptance as lens forms. A specific case of lenses with steeply curved front spherical surfaces are lenses for treatment of aphakia (absence of the natural lens of the eye as in the case of surgical removal of the lens). Such lenses serve essentially as an eye lens replacement and are characterized by great thickness and high plus power (greater than +5 D and typically +12 D or greater).

A drawback of Wollaston section lenses is that due to the large front surface curvature such lenses cannot be fitted like panes into a single frame size, but, in fact, each prescription itself would dictate its own specialized frame size and style.

In this context, U.S. Pat. No. 6,142,624 teaches a lens wherein the front surface is spherical, having a fixed radius of less than 35 mm for all prescription values in the series. Hence, it is suggested that lenses having the same front surface power can be used for the entire series of lenses. Further, a radius of a reference sphere or shell and a location of the lens as worn are such that the center of the reference sphere or shell lies close to or within the centroid of rotation of the eye. Thereby, a large field of view with low aberrations can be provided.

Nonetheless, conventional spherical lenses closely follow the flatter, lower Ostwalt section front curvature, even though the higher base curve branch produced lenses with less distortion. The vast majority of conventional prescription lenses are relatively flat, single vision, meniscus lenses which are glazed like window panes into flat outline spectacle frames. Conventional aspheric lenses generally use flatter base curves even than suggested by the Ostwalt section of Tscherning's ellipse. This can result in thinner and lighter lenses.

U.S. Pat. No. 3,960,442 A discloses an ophthalmic lens series incorporating an aspheric, atoric design concept which shall allow the selection of lens base curves substantially independently of traditional field of view or marginal error performance criteria. It is suggested to apply an aspheric correction according to a specific formula.

In particular, U.S. Pat. No. 3,960,442 A discloses a general purpose ophthalmic lens series incorporating an aspheric, atoric design concept which allows the selection of lens base curves substantially independently of traditional field of view or marginal error performance criteria. Factors of sensitivity of field errors to fitting distance, shape magnification, geometric distortion, eyelash clearance, reflections, applicability to large spectacle frames and general cosmetic appearance are optimized by base curve selection and field corrections are attended to by aspherizing one or both surfaces of the lenses.

US 2003/0169397 A1 teaches that noncorrective protective eyewear with lateral wrap and pantoscopic tilt introduce prismatic distortion and astigmatism into lenses that interfere with good optical performance. The lenses of this disclosure shall have an optical axis that is deviated away from the line of sight, in a direction generally opposite the inward tilt of the lateral wrap and/or the incline of pantoscopic tilt, to offset the tilt induced prism. Low power may be introduced into the lenses to decrease their taper, further offset the tilt induced prism and astigmatism (particularly in peripheral fields of view), lessen weight, provide better physical stability, and allow more uniform light transmission than plano lenses. The lenses may be cut from lens blanks in which the A line of the lens is at a non-zero angle to an equator of the lens, and the optical center of the lens may be horizontally and vertically displaced from the geometric center of the lens, and even off the lens altogether.

WO 98/48315 A1 discloses an ophthalmic article including a first lens element having a front and rear surface; and a complementary lens element capable of bearing a prescription (Rx) surface having a front surface so shaped to closely approach at least a portion of the rear surface of the first lens element; the complementary lens element providing at least a portion of the refractive power required by the wearer; the ophthalmic article remaining substantially free of optical distortion. Also, the disclosure provides an optical lens element including a front and back surface, at least one surface being continuous, and forming a prescription (Rx) zone and optionally a non-prescription peripheral temporal zone, at least one surface exhibiting a change of base curve across the field of vision of the wearer; the front and/or back surface bearing a surface correction to at least partially adjust for optical errors. A method of designing the lens element is also disclosed.

SUMMARY

It is an object of the present disclosure to provide an improved series of spectacle lenses that overcome one or more of the difficulties identified above. It would be particularly advantageous to provide a spectacle lenses having reduced distortion without increasing blur or cost.

The claimed subject matter is defined in the appended independent claims.

Further exemplary embodiments are defined in the dependent claims.

To better address one or more of these concerns, according to a first aspect of the disclosure, a series of spectacle lenses is provided, each lens having:

a spherical front surface and an aspheric, atoric, or freeform back surface;

wherein each lens of the series provides a focal power $P_x$ between −6 D and +4 D; and wherein at least one lens of the series provides a focal power Px between −0.75 D and +2.25 D, in particular between −0.5 D and +2.00 D;

wherein, for an upper range of focal powers, lenses having same nominal front surface power are provided, wherein the nominal front surface power corresponds to an (actual) radius of curvature of the front surface; and wherein, for a lower range of focal powers, lenses having same minimum nominal back surface power are provided, wherein the minimum nominal back surface power corresponds to an (actual, negative sign) minimum absolute value of a radius of curvature of the back surface; and the spherical front surface having a nominal front surface power $P_f$ and the back surface having a minimum nominal back surface power $P_b$; wherein $15.5 \ D \leq |P_f| + |P_b| + |P_x| \leq 31.5 \ D$ applies for each spectacle lens of the series.

The basic idea of the disclosure is to provide a series of spectacle lenses that follow a high base curve design philosophy and enable reduced distortion while at the same time providing advantages with respect to manufacturing. It has been found that the combination of a spherical front surface and an aspheric, atoric, or freeform back surface, in particular wherein the front surface curvature is neither on the Ostwalt branch nor on the Wollaston branch of Tscherning's ellipse, more precisely above the Ostwalt branch and/or below the Wollaston branch, can provide advantageous results regarding reduced distortion compared to existing products. The spherical front surface power in conjunction with the back surface power of the lens (together with parameters such as the lens thickness and the index of refraction of the lens material) determines the optical properties of the lens. Herein, each lens of the series according to this first aspect is adapted to provide a focal power $P_x$ between −6 D and +4 D. Over 95% of all prescriptions fall within the range of −6 to +4 diopters. At least one lens of the series, in particular at least two or three lenses of the series, provides a focal power Px between −0.75 D and +2.25 D, in particular between −0.5 D and +2.00 D. The lower boundary of the range may be one of −0.75 D, −0.50 D, −0.25 D, −0 D, +0.25 D, +0.50 D. The upper boundary of the range may be one of +0.50 D, +0.75 D, +1.00 D, +1.25 D, +1.50 D, +1.75 D, +2.00 D, +2.25 D. In the solution proposed herein, the range of focal powers, i.e., the range between −6 D and +4 D, comprises or is divided into an upper first range of focal powers and a lower second range of focal powers.

Generally, the ability of a lens to refract and to focus light—by either converging or diverging it—is referred to as its focal power or refractive power, or simply just power of the lens. In the given example, the refractive index of the lens material is assumed to be n=1.530, so that nominal powers correspond to actual powers. As a first order approximation, the focal power of a lens is equal to the net effect of its front and back surfaces. In this approximation, the focal power of lens, in diopters, can be given by:

focal power=front surface power+back surface power;

or $$P_x = P_f + P_b \qquad (1),$$

where $P_x$ is the focal power of the lens in diopters, $P_f$ is the front surface power in diopters and $P_b$ is the back surface power in diopters. For example, for a lens with a +6.00 D front surface power (corresponding to a front surface curve of +88 mm radius for a lens material having a refractive index of n=1.530) and a −4.00 D back surface power (corresponding to a back surface curve of −0.13 m radius for a lens material having a refractive index of n=1.530), the focal power $P_x$ is equal to $P_f + P_b = 6.00 + (-4.00) = +2.00$ D. It will be appreciated that this approximation changes slightly when also the lens thickness is considered which is left out here for simplification. For astigmatic or progressive lenses, the equation may only apply along a meridian, more specifically along the principal meridian with the lower curvature or numerically lower value.

As can be seen from this approximation, for a constant nominal back surface power, the focal power of the lens scales linearly with the nominal front surface power. Correspondingly, for a constant nominal front surface power, the optical power of the lens scales linearly with the nominal back surface power.

In the solution proposed herein, it is suggested to divide the range of focal powers into an upper range and a lower range of focal powers. On the one hand, for the upper range of focal powers of the proposed series, lenses having the same nominal front surface power are provided. Hence, in this upper range, a variation of the focal power of the lens is effected by a variation of the nominal back surface power. This enables that for the spherical front surface in the upper range of focal powers, a steepest conventional base curve available which fits conventional frames can be selected while at the same time providing various focal powers.

On the other hand, for the lower range of focal powers of the proposed series, lenses having same minimum nominal back surface power are provided. Hereby, the nominal surface power of the back surface may be limited by the curvature that can be cut and polished with existing freeform generators, i.e., by a minimum absolute value of a radius of curvature that can be manufactured. For a concave back surface, the radius is negative. Since the back surface has a negative curvature, a minimum nominal back surface power, as used herein refers to a maximum absolute value of the nominal back surface power of a lens of the series in any location of the back surface but with negative sign, thus a minimum nominal back surface power. It will be appreciated from the above approximation that for a given steep front surface curve, an even higher nominal back surface power would be required to achieve negative focal powers. Hence, the proposed series of lenses takes this into account and uses the same minimum back surface power over the lower range of focal powers. In the lower range, a variation of the focal power of the lens is thus effected by varying the nominal front surface power of the lens.

An advantage of this approach is that it becomes possible to use a steepest conventional base curve available (which fits conventional frames) that allows the back surface to be cut and polished with existing freeform generators. In particular, the solution proposed herein can use spherical (semi-finished) lens blanks compatible with conventional frames, along with an aspheric, atoric, or freeform back surface produced by existing freeform generators. In other words, the nominal front surface power used for the front surface can be the steepest curve which is (a) compatible with existing frames, and such that (b) the back surface is not too steep to be cut and polished with freeform generators.

It shall be understood that as used herein, the same nominal surface power can refer to a value ±0.5 diopters, in particular to a value ±0.25 diopters. Hence, already existing spherical lens blanks which may be produced in 1 or 0.5 diopter steps can be used for the front surface. A maximum or minimum nominal surface power can thus also refer to a maximum or minimum practical implementation, in particular wherein existing manufacturing tools, forms, or semi-finished lens blanks can be re-used for the high base curve design as proposed herein.

The high base curve design philosophy, wherein for each lens of the series of spectacle lenses a high curvature is provided for the front and/or back surface both in the lower range and in the upper range can be described by the expression $15.5 \ D \le |P_f| + |P_b| + |P_x| \le 31.5 \ D$. For example, for a focal power of 0 D, a nominal front surface power of $P_f = +12$ D (corresponding to a front surface curve of 44 mm radius) and a nominal back surface power of $P_b = -12$ D (corresponding to a back surface curve of −44 mm radius) may be provided. For a focal power of +2 D, a nominal front surface power of $P_f = +12$ D and a nominal back surface power of $P_b = -10$ D (corresponding to a back surface curve of −53 mm radius) may be provided. For a focal power of +4 D, a nominal front surface power of $P_f = +12$ D and a nominal back surface power of $P_b = -8$ D (corresponding to a back surface curve of −66 mm radius) may be provided. For a focal power of −4 D, a nominal front surface power of $P_f = +9$ D (corresponding to a front surface curve of 59 mm radius) and a nominal back surface power of $P_b = -13$ D (corresponding to a back surface curve of −41 mm radius) may be provided. Unless otherwise stated, the refractive index of the lens material as used herein is assumed to be n=1.530, so that nominal powers correspond to actual powers. Depending on the constraints due to manufacturing or spectacle frames, different boundaries may be selected. For example, a lower boundary of one of 22 D, 21 D, 20 D, 19 D, 18 D, 17 D, 16 D, 15 D, and/or 14 D; and/or an upper boundary of one of 24 D, 27 D, 28 D, 29 D, 30 D, 31 D, and/or 32 D can be set. The relation $15.5 \ D \le |P_f| + |P_b| + |P_x| \le 31.5 \ D$ shows that a high level of curvature is provided for all spectacle lenses of the series. Nevertheless, an upper threshold is provided indicating that the nominal surface powers of the spherical front surface and of the back surface are typically selected to ensure good manufacturability. Optionally, lenses in smaller range of focal powers may be provided e.g., having a lower boundary of one of −5 D, −4 D, −3 D, and/or −2 D; and/or an upper boundary of one of +1 D, +2 D and/or +3 D.

Compared to the solution proposed herein, conventional lenses generally use flatter base curves. Conventional aspheric lenses generally even use flatter base curves than suggested by the lower branch of Tscherning's ellipse. The asphericity can maintain a good optical performance in terms of blur, but the lower base curve increases the distortion.

The aforementioned U.S. Pat. No. 6,142,624 can provide excellent results in terms of distortion, but requires an unconventional process, has limited focal power coverage, and requires special frames. The solution proposed herein reduces the complexity in manufacturing in that for the upper range of focal powers, where the nominal surface power of the back surface is not limiting, lenses having the same nominal front surface power are provided and, in contrast to U.S. Pat. No. 6,142,624, for a lower second range of focal powers lenses having the same minimum nominal back surface power are provided, such that the back surface can be cut and polished with existing freeform generators.

In summary, a high base curve spherical front surface in combination with an aspheric, atoric, or freeform back surface under the boundary conditions that the front surface can easily be manufactured and/or be compatible with conventional frames and that the back surface curvature is compatible with freeform generators can provide an advantageous reduction of distortion compared to existing products without increasing the blur or cost.

According to a second aspect of the disclosure, a spectacle lens is provided. The spectacle lens has a spherical front surface and an aspheric, atoric, or freeform back surface, wherein the spherical front surface in conjunction with the back surface of the lens is adapted to provide a focal power $P_x$ between +0.25 D and +2.25 D; the spherical front surface having a nominal front surface power $P_f$ and the back surface having a minimum nominal back surface power $P_b$, wherein the nominal front surface power corresponds to an (actual) radius of curvature of the front surface and wherein the minimum nominal back surface power corresponds to an (actual) minimum absolute value of a radius of curvature of the back surface; wherein $15.5 \ D \le |P_f| + |P_b| + |P_x| \le 31.5 \ D$.

Optionally, the nominal front surface power can correspond to a predetermined maximum nominal front surface power, in particular a front surface power between at least one of +8 D (corresponding to a front surface curve or true base curve having a radius of r=(1.53−1)/8 D=66.3 mm) and +15 D (r=35.3 mm), +8 D (r=66.3 mm) and +13.5 D (r=39.3 mm), and +10 D (r=53.0 mm) and +12 D (r=44.2 mm), in particular a maximum nominal front surface power compatible with conventional spectacle frames, or the minimum nominal back surface power can correspond to a predetermined minimum nominal back surface power, in particular between at least one of −15 D (r=−35.3 mm) and −8 D (r=−66.3 mm), −14 D (r=−37.9 mm) and −8 D (r=−66.3 mm), and −13.5 D (r=−39.3 mm) and −10 D (r=−53.0 mm), in particular a minimum nominal back surface power compatible with a freeform generator. Alternatively or in addition, the nominal front surface power may correspond to a predetermined nominal front surface power between +8 D (r=66 mm) and at least one of +9 D (r=59 mm), 9.5 D (56 mm) and 10 D (53 mm). A positive radius may denote a convex (front) surface, whereas a negative radius may denote a concave (back) surface.

Thereby, a spectacle lens having one or more of the advantages described above is provided.

According to a third aspect, there are provided eyeglasses comprising a spectacle lenses, typically one left and one right spectacle lens, according to the second aspect; and an eyeglass frame including left and right temple pieces and a nose bridge for supporting the spectacle lenses on a face of a wearer. The eyeglasses may comprise left and right spectacle lenses selected from a series as disclosed herein.

In this way, it is possible to produce eyeglasses which have one or more of the advantages described above.

According to a fourth aspect, there is provided a computer-implemented method for determining or designing a spectacle lens, in particular through the use of a non-transitory computer readable medium, the spectacle lens having a spherical front surface and an aspheric, atoric, or freeform back surface; wherein the spherical front surface in conjunction with the back surface of the lens is adapted to provide a focal power $P_x$ between −6 D and +4 D, in particular between −0.75 D and +2.25 D; the spherical front surface having a nominal front surface power $P_f$, and the back surface having a minimum nominal back surface power $P_b$, wherein the nominal front surface power corresponds to an (actual) radius of curvature of the front surface and wherein the minimum nominal back surface power corresponds to an (actual) minimum absolute value of a radius of curvature of the back surface; wherein 15.5 D≤|$P_f$|+|$P_b$|+|$P_x$|≤31.5 D; the method comprising the steps of:

obtaining data eyeglass prescription data of an eye of a user, the prescription data comprising a focal power;

determining whether the focal power belongs to an upper first range of focal powers, wherein lenses having same nominal front surface power are provided; or to a lower range of focal powers, wherein lenses having same minimum nominal back surface power are provided;

if the focal power belongs to the upper first range, selecting the nominal front surface power and determining the nominal back surface power such that the spherical front surface in conjunction with the back surface of the lens provides the focal power, or if the focal power belongs to the lower range, selecting the minimum nominal back surface power and determining the nominal front surface power such that the spherical front surface in conjunction with the back surface of the lens provides the focal power.

In this way, it is possible to design a spectacle lens which has one or more of the advantages described above. It shall be understood that obtaining eyeglass prescription data of an eye of a user, wherein the prescription data comprises a focal power, can more precisely refer to obtaining a design value or desired focal power value to be provided by a stock lens or prescription lens. Stock lenses may, for example, provide power values in 0.25 D steps for spherical and optionally for astigmatic correction.

According to a fifth aspect, a method for manufacturing a spectacle lens is provided, the method comprising the steps of determining a lens design for a spectacle lens according to the method of the previous aspect; and manufacturing the spectacle lens according to the lens design.

In this way, it is possible to produce a spectacle lens which has one or more of the advantages described above.

According to a sixth aspect a, in particular non-transitory, computer program product is presented comprising program code means for causing a computer to carry out the steps of the method according to the fourth aspect when the computer program is carried out on a computer or processing unit.

According to a seventh aspect, there is provided a machine readable storage medium having stored thereon a computer program comprising program code means for carrying out the steps of the method according to the fourth aspect or one of its exemplary embodiments.

According to an eighth aspect, there is provided a series of spectacle lenses, each lens having:

a spherical front surface and an aspheric, atoric, or freeform back surface; wherein each lens of the series provides a focal power $P_x$ between −6 D and +4 D;

wherein, for an upper range of focal powers, at least lenses having same nominal front surface power are provided, wherein the nominal front surface power corresponds to a radius of curvature of the front surface, wherein each of the at least three lenses provides a different focal power $P_x$; and wherein, for a lower range of focal powers, lenses having same minimum nominal back surface power are provided, wherein the minimum nominal back surface power corresponds to a minimum absolute value of a radius of curvature of the back surface;

the spherical front surface having a nominal front surface power $P_f$ and the back surface having a minimum nominal back surface power $P_b$; wherein 15.5 D≤|$P_f$|+|$P_b$|+|$P_x$|≤31.5 D applies for each spectacle lens of the series; and wherein the series comprises at least three spectacle lenses having different focal powers $P_x$ in the upper range; and wherein at least two of the at least three spectacle lenses of the upper range are spaced by no more than 0.5 D in terms of their focal power $P_x$.

In other words, the upper range may comprise at least three pairwise different types of spectacle lens, wherein each of the different types of spectacle lens of the upper range provide pairwise different focal powers $P_x$.

Preferred embodiments of the disclosure are defined in the dependent claims. It shall be understood that the claimed eyeglasses, spectacle lenses, method, computer program and medium can have similar and/or identical exemplary embodiments as the claimed series of spectacle lenses, in particular as defined in the dependent claims and as disclosed herein.

In the following, some terms which are used throughout the application, shall be shortly explained and defined:

Unless otherwise indicated, the terminology used in the context of the present application corresponds to the definitions in the standard DIN EN ISO 13666: 2013-10 of the DIN (Deutsches Institut für Normung) e.V.

The term front surface shall refer to that surface of the lens portion intended to be fitted away from the eye, cf. No 5.8 of the standard DIN EN ISO 13666. The term back surface shall refer to that surface of the lens portion intended to be fitted nearer to the eye, cf. No 5.9 of the standard DIN EN ISO 13666.

The term spherical surface shall refer to a part of the inside or outside surface of a sphere, cf. No 7.1 of the standard DIN EN ISO 13666. The term aspherical surface shall refer to a part of a surface of revolution having continuously variable curvature from the vertex to the periphery, cf. No 7.3 of the standard DIN EN ISO 13666. Hence, in common usage an aspherical surface refers to a rotationally symmetric non-spherical surface, i.e., not just a surface that is not a sphere.

A meridian (of a surface) shall refer to any plane which contains the center(s) of curvature of a surface, cf. No 5.7.1 of the standard DIN EN ISO 13666. A meridian (of a lens) shall refer to any plane which contains the optical axis of a lens, cf. No 5.7.2 of the standard DIN EN ISO 13666. The term principal meridians (of a surface) shall refer to those meridians of a surface which show the maximum and minimum curvatures on measurement, cf. No 7.4 of the standard DIN EN ISO 13666.

The term atoroidal or atoric surface shall refer to a surface having mutually perpendicular principal meridians of unequal curvature, of which the cross-section on at least one principal meridian is not circular, cf. No 7.6 of the standard DIN EN ISO 13666. The term atoroidal or atoric surface can refer to a surface with two orthogonal axis of reflective symmetry.

The term freeform surface shall refer to a surface not having any type of symmetry. A freeform surface has no axis or point of symmetry. A freeform surface can refer to a surface that can only be described by splines and/or nurbs. A particular advantage of a freeform surface is that it can provide an optical surface that is optimized to the peculiarities of the eye of the wearer. Thereby, a freeform back surface can be optimized for a given position of wear, for example, be optimized for blur for a given position of wear (e.g., back vertex distance, tilt, and wrap). Optimization can be performed by known optical design tools such as by means of ray tracing design software.

The term spectacle lens shall refer to a lens intended to be used for purposes of measurement, correction, and/or protection of the eye, or for changing its appearance, cf. No 7.6 of the standard DIN EN ISO 13666. In particular, a spectacle lens may refer to a lens with dioptric, in particular, focal power. Spectacle lenses may include finished and/or edged spectacle lenses, semi-finished spectacle lenses, lens blanks, or molds therefor. Also included are wafers for forming laminated lenses or lens blanks.

The term curved-form lens shall refer to a lens having one surface convex (in all meridians) and the other surface concave (in all meridians), cf. No 8.2.2 of the standard DIN EN ISO 13666. Such a lens can also be referred to as a meniscus lens herein. The term spherical lens shall refer to a lens with two spherical surfaces, cf. No 8.2.3 of the standard DIN EN ISO 13666.

The term diopter shall refer to a unit of focusing power of a lens or surface, or of vergence (refractive index divided by the radius of curvature) of a wavefront, cf. No 9.1 of the standard DIN EN ISO 13666. Commonly used symbols for diopter are D and dpt. Diopters are expressed in reciprocal meters ($m^{-1}$).

The term plus-power lens, positive lens, or converging lens shall refer to a lens which causes parallel incident light to converge to a real focus, cf. No 9.13 of the standard DIN EN ISO 13666. The term minus-power lens, negative lens, or diverging lens shall refer to a lens which causes parallel incident light to diverge from a virtual focus, cf. No 9.14 of the standard DIN EN ISO 13666.

The term base curve shall refer to a nominal surface power (or nominal curvature), unless stated otherwise of the front surface, cf. No 11.4.1 of the standard DIN EN ISO 13666. The base curve can thus refer to a surface power in diopters for a refractive index of n=1.530.

The term nominal front or back surface power as used herein refers to the surface power assuming a fixed refractive index of the lens material of n=1.530. In other words, a standardized refractive index is used, cf. also No 11.4.1 and No. 11.4.3 of the standard DIN EN ISO 13666. The nominal surface power can thus be seen as a (geometric) property of the surface independent of the actual lens material. The nominal surface power can also be referred to as the curvature of the surface and by convenience is also given in the diopters. For a (spherical) lens, the relation between the nominal surface power in diopters and the curve or radius of curvature of the lens surface in meters is given by r=(n−1)/P=(1.530−1)/P, wherein r is the radius of curvature, n=1.530 the assumed fixed refractive index, and P the nominal surface power. Hence, a nominal front/back surface power can correspond to an actual front/back surface curve having a radius. A nominal surface power can be converted into an actual surface power by $P_{actual} = P_{nominal} * (n_{actual} - 1)/(1.530 - 1)$, wherein $P_{actual}$ is the actual surface power that depends on the actual refractive index of the lens material, $P_{nominal}$ is the nominal surface power, and $n_{actual}$ is the actual refractive index of the lens material. Since the curvature of the front and back surface are limited by 'geometric' constraints due to manufacturing or to be compatible with conventional spectacle frames, the nominal and not the actual front and back surface powers are specified in the claims.

The actual surface power on the other hand refers to the ability of a surface to refract light and therefore requires taking into account the actual material index of the lens material to be used. The actual surface power can thus be seen as an (optical) property of the surface which depends on the actual lens material.

For the back surface, reference is made to a minimum nominal back surface power. Since the back surface usually has a negative curvature, it will be appreciated that a minimum nominal back surface power essentially corresponds to a maximum power value but with negative sign, thus a minimum nominal back surface power. Alternatively, reference can be made to a maximum absolute power provided at any location on the back surface. For a non-spherical surface, as for example in an astigmatic or progressive lens, reference can be made to the meridian of numerically lower value, cf. No 11.4.3 of the standard DIN EN ISO 13666. While the front surface as a spherical surface has substantially the same curvature over its entire surface, this does not apply to an aspheric, atoric, or freeform surface, wherein different curvatures are present on different parts of the surface. In view of the manufacturing constraint by freeform surface generators, the minimum nominal back surface power may therefore indicate the maximum negative power or curve that has to be manufactured by the freeform generator on the back surface of the lens.

Unless otherwise stated, the term focal power as used herein shall refer to an actual focal power provided by the spectacle lens. It can be understood as a corrective optical power provided by the spectacle lens as desired by the user. The actual focal power is thus the relevant parameter for the user and therefore used herein. If the actual refractive index of the lens material $n_{actual}$ differs from the nominal refractive index of the lens material of n=1.530, the focal power of the lens can be approximated based on modified equation (1) given by:

$$P_x = P_{f,actual} + P_{b,actual} = (P_{f,nominal} + P_{b,nominal})(n_{actual} - 1)/(1.530 - 1) \quad (2),$$

wherein $P_x$ is the actual focal power of the lens, $P_{f,\,actual}$ and $P_{b,actual}$ are the actual front and back surface powers that depend on the actual refractive index of the lens material, $P_{f,nominal}$ (or simply $P_f$) and $P_{b,nominal}$ (or simply $P_b$) are the nominal front and back surface powers for an assumed refractive index of the lens material of n=1.530 (corresponding to a radius of curvature of the front/back surface), and $n_{actual}$ is the actual refractive index of the lens material. The focal power can be measured, for example, with an FOA (focal-point-on-axis) focimeter according to No 8.3.2 of the standard DIN EN ISO 13666.

It shall be understood that the absolute value signs, as for example used in $|P_b|$, provide a positive value. It shall further be understood that, for example, for a prescription with cylinder there are two focal powers as well as different back surface curvatures. As used herein, $P_x$ refers to the smallest (signed) focal power and $P_b$ to the minimum (signed) nominal back surface power. For example, for the minus cylinder convention a +4 D sphere with a −3 D cylinder at 90 degrees corresponds to a smallest focal power $P_x$ of +1 D. Correspondingly, a −2 D sphere with a −1 D cylinder corresponds to a smallest focal power $P_x$ of −3 D.

In an exemplary embodiment of the series of spectacle lenses according to the first aspect, each lens can be a meniscus lens having a positive nominal front surface power (corresponding to a positive radius of curvature) and a negative nominal back surface power (corresponding to a negative radius of curvature). Such type of lens can also be referred to as a curved-form lens having a convex or positively curved front surface and a concave or negatively curved back surface. Such a type of lens can also be referred to as a bent lens having a meniscus—which means "crescent shaped" form. Bent lenses use convex front curves and concave back curves.

In a further exemplary embodiment of the series of spectacle lenses, the same nominal front surface power in the upper range of focal powers can be between at least one of +8 D and +15 D, +8 D and +13.5 D, and +10 D and +12 D corresponding to a front surface curve having a radius between at least one of +66 mm and +35 mm, +66 mm and +39 mm, +53 mm and +44 mm.

The nominal front surface power in the upper range of focal powers can correspond to a (predetermined or preset) maximum nominal front surface power, in particular a maximum nominal front surface power compatible with conventional spectacle frames. In the alternative or in addition, the maximum nominal front surface power can be determined by available spherical semi-finished lens blanks in manufacturing. Advantageously, spherical semi-finished lens blanks compatible with conventional frames are used in manufacturing. Advantageously, an optical lens or series of optical lenses having a nominal front surface power between +8 D and 10.5 D (between 66 mm and 50 mm), in particular having a nominal front surface power or upper boundary of the range of +8 D (r=66 mm), +9 D (r=59 mm) or +10 D (r=53 mm) can be provided.

In a further exemplary embodiment of the series of spectacle lenses, the same minimum nominal back surface power in the lower range of focal powers can be between at least one of −15 D and −8 D, −14 D and −8 D, −13.5 D and −10 D, corresponding to a back surface curve having a radius between at least one of −35 mm and −66 mm, −38 mm and −66 mm, and −39 mm and 53 mm.

The minimum nominal back surface power of the lower second range can correspond to a (predetermined or preset) minimum nominal back surface power, in particular a minimum nominal back surface power compatible with a freeform generator. Advantageously, the minimum nominal back surface power (i.e., negative value of a maximum amount of back surface curvature) is adapted to be cut and polished with (existing) freeform generators. In an exemplary embodiment the constraint can be that the aspheric, atoric, or freeform back surface does not exceed −13.25 D in curvature in any location. Hence, the freeform generator may be capable of cutting a radius of curvature of down to r=−40 mm. However, it shall be understood that the given exemplary value is not necessarily a hard limit for freeform generators. It should further be highlighted that a "same" curvature can refer to a given value ±0.5 D. Hence, spherical semi-finished lens blanks can be used for manufacturing the front surface in particular existing spherical semi-finished lens blanks having integer values of curvature which may already be available in existing manufacturing lines. In the given example, a nominal back surface power of −13 D (r=41 mm) instead of −13.25 D (r=40 mm) may thus be used in conjunction with an appropriate integer valued nominal front surface power to provide a desired focal power.

In a further exemplary embodiment the upper range of focal powers can cover a range between a (predetermined or first) threshold and +4 D; and the lower range of focal powers can cover a range between −6 D and the (predetermined or first) threshold. Alternatively, different thresholds can be used for the upper and lower range. However, advantageously the desired range of focal powers of the lenses of the series are divided into two, in particular exactly two sections, referred to as the lower range and the upper range of focal powers.

In an exemplary embodiment the predetermined threshold is indicative of a sum of the (same) nominal front surface power of the upper range and the (same) minimum nominal back surface power of the lower range. For example, the (same) nominal front surface power of the upper range may be indicative of a spherical semi-finished lens blanks compatible with conventional frames. For example, the (same) minimum nominal back surface power of the lower range may be indicative of a maximum negative curvature in any location of the back surface that can be manufactured by a freeform generator. In a practical implementation of a lens series, the (same) minimum nominal back surface power is likely to have a greater absolute value than the (same) nominal front surface power. For example, assuming a spherical nominal front surface power cannot exceed 12 D (r=44 mm) and the nominal back surface power cannot exceed −13.25 D (r=40 mm), the predetermined threshold can be set at −1.25 D. However, the predetermined threshold can also be set at integer diopter values for example between −4 D to +1 D, in particular between −3 D and 0 D, typically one of −4 D, −3D, −2 D, −1 D, 0 D or +1 D.

In an exemplary embodiment, the back surface can be further adapted to provide astigmatic correction. Hence, advantageously, the astigmatic correction is provided on the back surface which can be manufactured easily by a freeform generator. It shall be understood that any effect of the astigmatic correction on the curvature may also lead to a shift of the upper and lower range such that the constraints regarding manufacturability are still met.

In an exemplary embodiment, the lens of the series of lenses can be adapted as a single vision or progressive lens. Advantageously, contributions to the progressive power are also implemented by shaping the back surface. An advantage is that the back surface can easily be manufactured using a freeform generator, whereby the spherical front surface can be maintained. Hence, semi-finished spectacle lenses and/or lens blanks can be provided wherein the front surfaces of the series of lenses are already finished such that only the back surface has to be processed using a freeform generator.

In an exemplary embodiment the (upper range of the) series of lens elements may comprise at least three different spectacle lenses having different focal powers $P_x$ in the upper range. In other words, the upper range can comprise at least three pairwise different types of spectacle lens, wherein each of the different types of spectacle lens of the upper range provide pairwise different focal powers $P_x$. Correspondingly, in addition or in the alternative, the (lower range of the) series of lens elements may comprise at least three different spectacle lenses having different focal powers $P_x$ in the lower range. In other words, the lower range can comprise at least three pairwise different types of spectacle lens, wherein each of the different types of spectacle lens of the lower range provide pairwise different focal powers $P_x$. The focal power $P_x$ may refer to the focal power without cylinder.

Optionally, the focal power powers $P_x$ of at least two of the at least three spectacle lenses (of the upper range) having different focal powers $P_x$ in the upper range may be spaced by at least 2 D, in particular by at least 3 D. Correspondingly, the focal power powers $P_x$ of at least two of the at least three spectacle lenses (of the lower range) having different focal powers $P_x$ in the lower range may be spaced by at least 2 D, in particular by at least 3 D. Thereby, the lower and/or upper range each may cover a substantial portion of a range between −6 D and +4 D. In addition or in the alternative, the focal power powers $P_x$ of at least two of the at least three spectacle lenses of the upper range may be spaced by no more than 0.5 D, in particular by no more than 0.25 D. Thereby different ranges may be addressed in a cost-effective manner with spectacle lenses having low distortion.

Optionally, the series of lens elements, in the lower range may comprise only spectacle lenses wherein the nominal front surface powers are spaced by 1 D (±25%). An advantage of this exemplary embodiment is that also in the lower range only a limited number of pucks having a spherical front surface e.g., at 1 D intervals have to be provided. The manufacturing cost may thus be further reduced.

It shall be understood that a single vision lens can essentially correspond to a far vision zone of a progressive lens. The features provided for the spectacle lenses of the series may apply at least for the far vision zone of a progressive lens. Advantageously, they also apply for one or more further zones of the progressive lens, for instance a near vision zone.

It is to be understood that the features mentioned above and those yet to be explained below may be used not only in the combination respectively indicated, but also in other combinations or separately, without departing from the scope of the present disclosure.

BRIEF DESCRIPTION OF THE DRAWINGS

The disclosure will now be described with reference to the drawings wherein.

DESCRIPTION OF PREFERRED EMBODIMENTS

Figure 1:
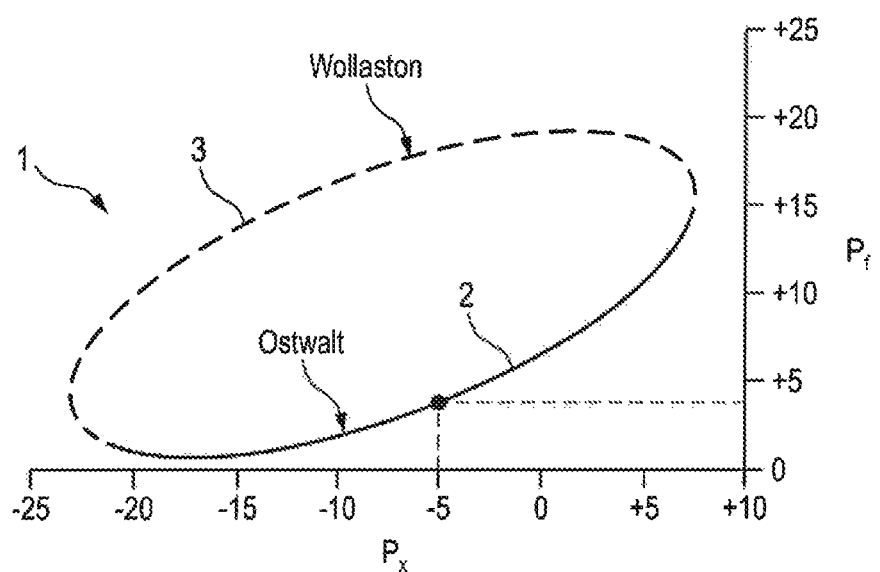
FIG. 1 shows a drawing of a Tscherning ellipse including the lower Ostwalt section and the upper Wollaston section.

FIG. 1 shows a drawing of a Tscherning ellipse 1. In 1904, M. Tscherning demonstrated mathematically that there are in fact two recommended or "best form" spherical best curves 2, 3 for each focal power of the lens: A steeper series and a flatter series. The steeper series is also referred as the Wollaston section 3 and is based upon the steeper solutions to Tscherning's formula. The lower series is also referred to as the Ostwalt section 2 and is based on the flatter solution of Tscherning's formula. The flatter Ostwalt branch of the ellipse serves as the basis for modern "best form" lenses.

Tscherning's ellipse indicates the optimum spherical base curve or nominal front surface power to use for each focal power in order to reduce or eliminate lens aberration. Conventional spherical lenses closely follow the flatter, lower curvature front, even though the higher base curve branch has been found to produce lenses with less distortion. Flatter lens forms, while thinner and lighter, however may produce significant lens aberrations, including larger astigmatic and spherical power errors in the periphery of the lens.

Conventional aspheric (and atoric) lenses generally use flatter base curves even than suggested by the lower branch of Tscherning's ellipse. This can result in even thinner and lighter lenses. The asphericity can maintain the good optical performance in terms of blur, but the lower base curve increases the distortion.

According to Tscherning's ellipse 1, each individual focal power should be made using a separate front surface curvature. Early best form lenses utilized this approach, which required a massive and costly inventory of lens blanks.

Figure 2:
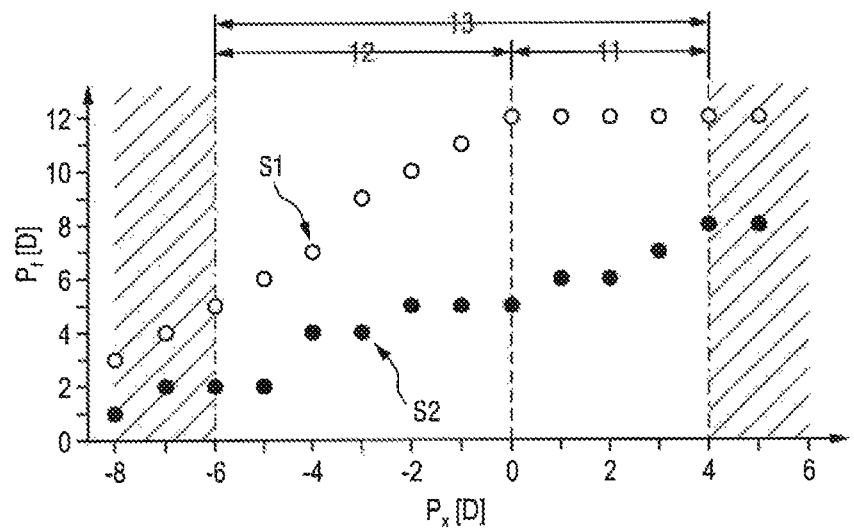
FIG. 2 shows a diagram of nominal front surface power versus focal power for two series of lenses.

FIG. 2 shows a diagram illustrating a nominal front surface power or base curve versus the focal power $P_x$ for a first series of spectacle lenses S1 and the second series of spectacle lenses S2. The lenses can for example be CR39 or allyl diglycol carbonate (ADC) lenses. The horizontal axis denotes the focal power in diopters [D], whereas the vertical axis denotes the nominal front surface power in diopters [D].

The series S1 shows a series of spectacle lenses according to an aspect of the present disclosure. The lenses feature a spherical front surface having respective nominal front surface powers as exemplarily shown in FIG. 2. The spherical front surfaces in conjunction with the back surfaces of the lenses of the series S1 are adapted to provide various focal powers $P_x$, in the given example between −6 D and +4 D. Other ranges of focal powers can be provided, for example starting from −5 D, −4 D or −3 D and ranging up to +1 D, +2 D or +3 D. At least one lens, in particular at least two, three, or four lenses, of the series S1 provides a focal power $P_x$ between 0.75 D and +2.25 D, in particular between −0.5 D and +2.00 D. It is to be understood that additional lenses can be provided between the items illustrated in FIG. 2, for example a spacing of 0.25 can be provided.

The series S1 of spectacle lenses provides a range 13 of focal powers comprising or consisting of a first, upper range 11 of focal powers and a second, lower range 12 of focal powers. For the upper range 11 of focal powers, lenses having same nominal front surface power are provided. In the given example, a maximum nominal front surface power of 12 D is used. Optionally, at least two lenses of the series, for example two lenses of the upper range and/or two lenses of the lower range, are spaced by no more than 0.5 D, in particular by no more than 0.25 D in terms of their focal power $P_x$. In addition or in the alternative, at least two lenses of the series, for example two lenses of the upper range and/or two lenses of the lower range, are spaced by at least 2 D, in particular by at least 3 D in terms of their focal power $P_x$.

For example, the upper range may comprise at least three pairwise different types of spectacle lens, wherein each of the different types of spectacle lens of the upper range provide pairwise different focal powers $P_x$. In this case, the series may not necessarily include at least one lens of the series providing a focal power $P_x$ between 0.75 D and +2.25 D. In addition or in the alternative, the lower range may comprise at least three pairwise different types of spectacle lens, wherein each of the different types of spectacle lens of the lower range provide pairwise different focal powers $P_x$. The focal power powers $P_x$ of at least two of the pairwise different types of spectacle lens of the upper range may be spaced by at least 2 D, in particular by at least 3 D.

Advantageously, the series of spectacle lenses uses a maximum nominal front surface power available (which fits conventional frames) that also allows the back surface to be cut and polished with existing freeform generators. It shall be understood that e.g., integer diopter values may be used for the curve for ease of manufacturing and to reduce the inventory and to provide compatibility with conventional manufacturing tools and/or spectacle frames. In an embodiment the (same or constant) nominal front surface power in the upper range 11 of focal powers can be a value, i.e., the same value throughout this upper range for the various lenses of the series, between +8 D and +15 D, typically between +8 D and +13.5 D, more typically between +10 D and +12 D, corresponding to a radius of curvature between +66 mm and +35 mm, typically between +66 mm and +39 mm, more typically between +53 mm and +44 mm. In particular, the nominal front surface power of the upper range of focal powers can correspond to a predetermined maximum nominal front surface power, in particular a maximum nominal front surface power compatible with conventional spectacle frames and/or manufacturing tools.

As shown in FIG. 2, the series of spectacle lenses further comprises a second, lower range 12 of focal powers with lenses having same minimum nominal back surface power. As explained above, the upper range 11 of focal powers can be limited by the maximum nominal front surface power, whereas the lower range 12 of focal powers can be limited by the minimum nominal back surface power to be cut and polished with existing freeform generators. The minimum nominal back surface power herein refers to the maximum negative nominal surface power of the back surface in any location of the spectacle lens.

In lower range 12 of focal powers the (same or constant) minimum nominal back surface power in any location of the lens can be between −15 D and −8 D, typically between −14 D and −8 D, typically between −13.5 D and −10 D, corresponding to a radius of curvature between −35 mm and −66 mm, typically between −38 mm and −66 mm, more typically between −39 mm and −53 mm. For example, the nominal back surface power cannot exceed 13.25 D, corresponding to a true base curve radius of r=40 mm, as a limit given by an exemplary freeform generator for manufacturing. Hence, the minimum nominal back surface power of the lower range may correspond to a predetermined minimum nominal back surface power, in particular a minimum nominal back surface power or corresponding radius of curvature compatible with a freeform generator.

The series S1 of spectacle lenses may cover a range 13 consisting of a lower range 12 and an upper range 11 of focal powers. The upper range of focal powers may cover a range between a predetermined threshold and +4 D and the lower range 12 of focal powers may cover a range between −6 D and the predetermined threshold. In an exemplary embodiment, the predetermined threshold is indicative of a sum of the (same) nominal front surface power of the upper range 11 and the (same) minimum nominal back surface power of the lower range 12. For example, for a nominal front surface power of the upper range of 12 D (r=44 mm) and a minimum nominal back surface power of the lower range of −13.5 D (r=39 mm), the predetermined threshold may be set at −1.5 D. It will be appreciated that the exact transition between the upper and lower range 11, 12 may depend on the steepest base curve compatible with the intended spectacle frames or manufacturing facilities such as available spherical semi-finished lens blanks on the one hand and manufacturing facilities for the nominal back surface power such as a minimum (maximum negative) curvature that can be provided by a freeform generator on the other hand. Correspondingly, referring to FIG. 2, this will impact the shape of the diagram of the spectacle series S1. In the shown example, the (same) nominal front surface power in the upper range and the (same) nominal back surface power in the lower range are assumed to be +12 D (r=+44 mm) and −12 D (r=−44 mm), respectively.

As can be seen from FIG. 2, the shape of the nominal front surface power in the lower range 12 increases almost linearly with focal power. For the same or constant minimum nominal back surface power in the lower range 12, the desired focal power $P_x$ is adjusted by selecting spherical nominal front surface powers accordingly to provide, in conjunction with the back surface of the lens, a desired focal power.

With the solution proposed herein, it is thus possible to follow a high base curve design philosophy without increasing cost for manufacturing. Furthermore is has been found that in contrast to very flat base curve designs a lower distortion can be reached.

The high base curve design philosophy is advantageously provided throughout the entire series. Hence, even for low focal powers between 0.75 D and +2.25 D, in particular between −0.5 D and +2.00 D the condition $15.5\ D \leq |P_f| + |P_b| + |P_x| \leq 31.5\ D$ is met for at least one lens element, in particular for at least two, three, or more (or all) lens elements.

Referring again to the lower range 12 of FIG. 2, a slope of the increase of nominal front surface power in the lower range 12 with focal power may be greater than one due to an increase in 'aspherization' for increasing minus powers. Therefore, one or more available nominal front surface powers may be skipped to get close to a maximum possible nominal front surface power without exceeding back surface curvature constraints.

Figure 3:
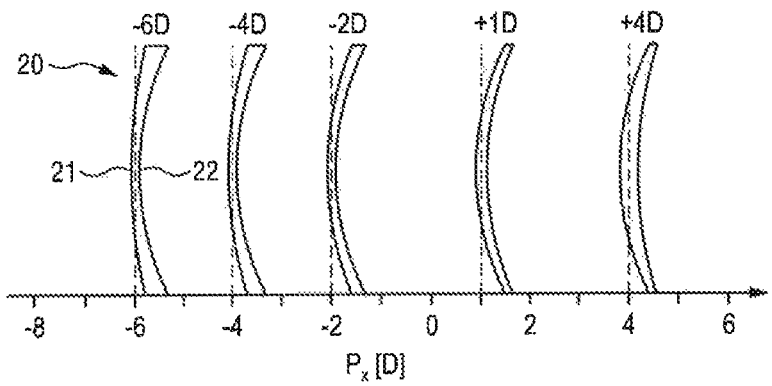
FIG. 3 shows a diagram of several exemplary embodiments of lenses of a high base curve lens series.

FIG. 3 shows exemplary spectacle lenses of the proposed series S1 of lenses of FIG. 2. As explained above, for the upper range 11 of focal powers, lenses having the same nominal front surface powers are provided and the desired focal power $P_x$ is achieved by tailoring the back surface. For the lower range 12 of focal powers, lenses having the same nominal back surface power are provided and the desired focal power $P_x$ is adjusted by selecting the spherical nominal front surface power accordingly.

For the graph of FIG. 3, a refractive index n=1.53 is assumed. It shall be understood that additional lenses as exemplarily shown in FIG. 3 can be provided for further focal powers P. In particular, focal powers may be provided at quarter diopter steps. In this case, the spherical front surfaces may nevertheless only be provided in full diopter steps and the nominal back surface power may be adjusted accordingly. This allows efficient manufacturing because only a limited inventory of spherical semi-finished lens blanks for generating the spherical front surface has to be provided and the back surface can be generated using existing freeform generators. Hence, for the lower range 12 of focal powers, as used herein, lenses having the same minimum nominal back surface power may refer to lenses having a minimum nominal back surface power within a range of ±0.5 diopters. It shall be understood that the minimum nominal back surface power may be limited by the minimum (negative) curvature that can be provided by the freeform generator used for manufacturing. The allowable minimum nominal back surface power can thus lie within a tolerance band of +1.0 to −0.0 D of the minimum (negative) curvature that can be provided by the freeform generator.

It shall be understood that also a lens material having a different refractive index may be used. For example, a lens material having a refractive index of n=1.499, a high-index material having a refractive index of n=1.670, and in general any material suitable for manufacturing a spectacle lens may be used.

Referring again to FIG. 2, a second series S2 of spectacle lenses is shown for comparison. The second series S2 follows a lower base curve. This lower base curve can be close to the Ostwalt section of Tscherning's ellipse, as shown in FIG. 1.

Figure 4:
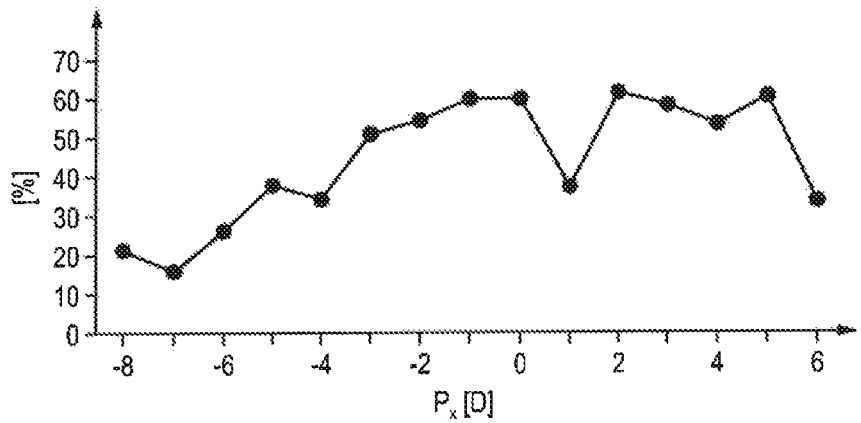
FIG. 4 shows a diagram of distortion reduction versus focal power for the lens series of FIG. 2.

FIG. 4 shows a diagram comparing the distortion provided by the series of lenses S1 having a high base curve and the second series of lenses S2. The horizontal axis denotes the focal power in diopters [D], whereas the vertical axis denotes the reduction of the distortion in [%]. The graph thus compares the distortion for a low base curve design series of lenses with a reduced distortion series of lenses as proposed herein. For the graph shown in FIG. 4, the constraint is that the nominal back surface power cannot exceed 13.25 D (corresponding to having a radius of curvature of no less than 40 mm) in any location and the spherical nominal front surface power cannot exceed +12 D (corresponding to having a radius of curvature of no less than 44 mm). As can be seen from FIG. 4, the distortion can be significantly reduced with the series of lenses S1. The distortion can be reduced by more than 50% over a significant range of focal powers $P_x$. For the graph shown in FIG. 4, the distortion is calculated as the difference in mean equivalent magnification at a center of a 20 m×20 m ray-traced grid located at 10 m distance directly in front of the observer and the value at any of the corners. Even for low focal powers $P_x$, improvement has been found as indicated by the exemplary +1 D lens of the series.

Figure 5:
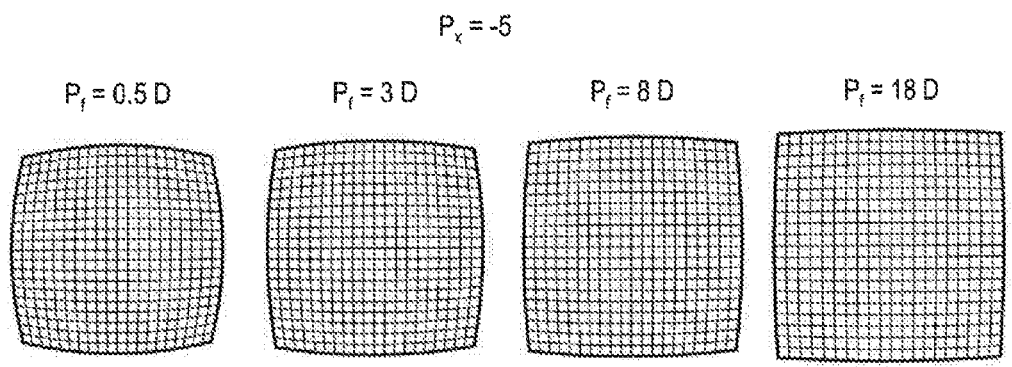
FIG. 5 shows four graphs of ray-traced grids indicative of the distortion for four exemplary embodiments of lenses.

FIG. 5 shows diagrams of ray-grids for four different possible −5 D focal power single vision lenses. The designs have four different spherical front surfaces as indicated in FIG. 5; from left to right a spherical nominal front surface power of $P_f$=+0.5 D, +3 D, +8 D and +18 D (corresponding to a radius of curvature of r=+1.1 m, +0.18 m, +66 mm and +29 mm). The designs corresponding to the first and third graph feature aspheric back surfaces, whereas the designs corresponding to the second and fourth graph feature spherical back surfaces.

The first design (leftmost in FIG. 5) having the +0.5 D spherical nominal front surface power is a flat base curve aspheric back surface lens. The second design having the +3 D spherical nominal front surface power corresponds to the lower branch (Ostwalt section) of Tscherning's ellipse. The third design refers to a lens design according to an aspect of the present disclosure. The fourth design having a very steep spherical back surface corresponds to the upper branch (Wollaston section) of Tscherning's ellipse, as shown in FIG. 1.

In FIG. 5, the grid is assumed to be 20 m×20 m located at 10 m distance directly in front of the observer. Hence, a field of view of ±45° is covered. Evidently, as can be seen from FIG. 5, the steeper the front curve, the less distortion of the grid. It has been found that by the proposed combination of high base curve design philosophy by using the steepest curve which is (a) compatible with existing frames and such that (b) the back surface is not too steep to be cut and polished with freeform generators an improved distortion lens can be provided with reasonable effort. The design as shown in the fourth figure of FIG. 5 further improves the distortion, however, at the cost of rather complex manufacturing and incompatibility with existing mass production processes and/or conventional frames.

Figure 6:
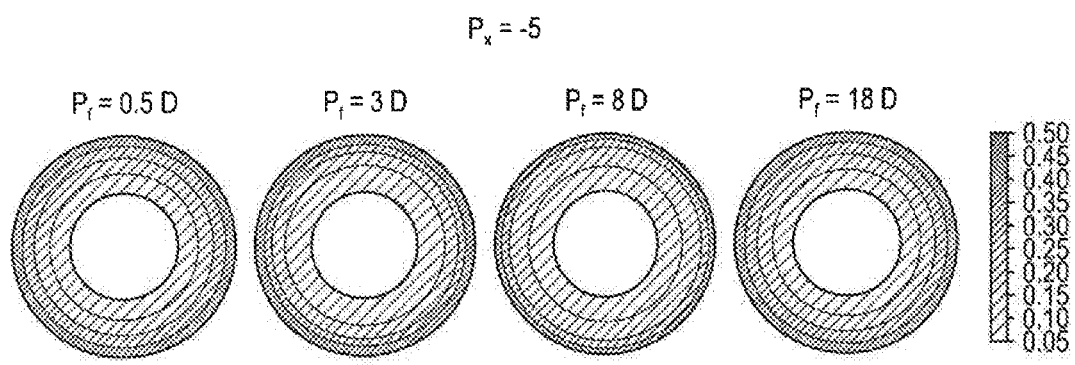
FIG. 6 shows a plot of the RMS blur for the lenses corresponding to FIG. 5.

FIG. 6 shows the RMS (root-mean-square) blur over ±45 degrees of eye rotation. It can be seen that the blur characteristics of the four lenses of FIG. 5 are similar. Hence, with the design proposed herein, an improved distortion can be provided while at the same time maintaining the good RMS blur performance of best form lenses.

Figure 7:
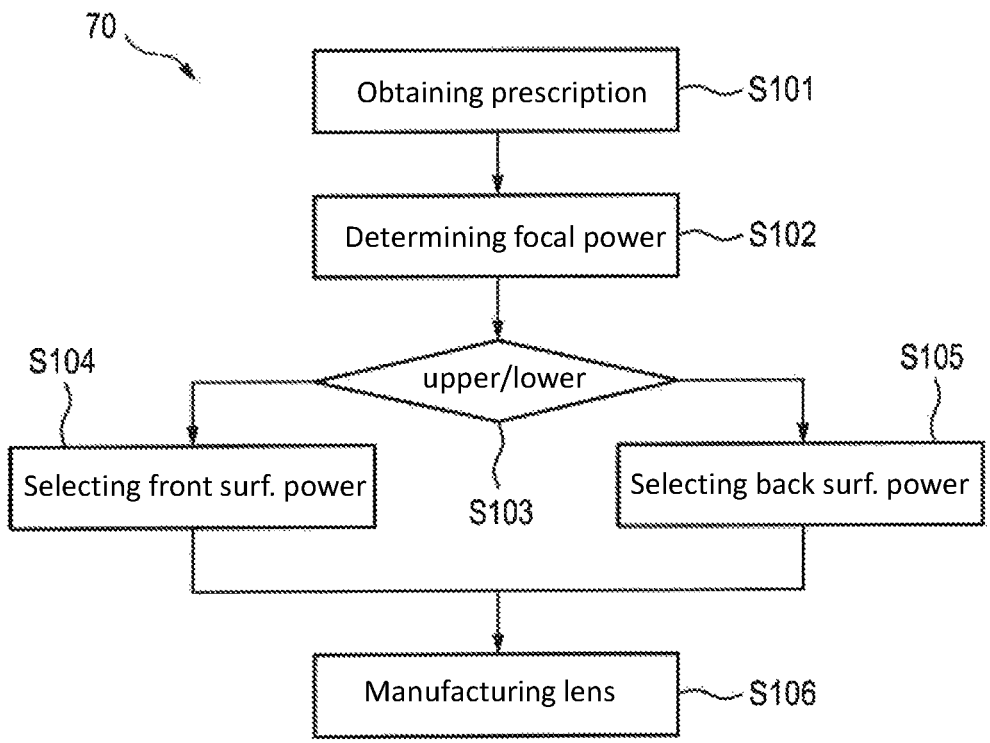
FIG. 7 shows a schematic flow chart of a method according to an aspect of the present disclosure.

FIG. 7 shows a flow chart of a method 70 according to an aspect of the present disclosure. Methods, as used herein, can in particular refer to computer-implemented methods. A method may be implemented in particular through the use of a non-transitory computer-readable medium. FIG. 7 illustrates a method for determining a spectacle lens, the spectacle lens having a spherical front surface and an aspheric, atoric, or freeform back surface. The spherical front surface in conjunction with the back surface of the lens is adapted to provide a focal power $P_x$ between −6 D and +4 D, in particular between −0.75 D and +2.25 D, in particular between −0.5 D and +2.00 D. The spherical front surface has a nominal front surface power $P_f$ and the back surface has a nominal back surface power $P_b$ wherein 15.5 D≤|$P_f$|+|$P_b$|+|$P_x$|≤31.5 D.

Advantageously, for each lens of the series the nominal front surface power $P_f$ is above a nominal front surface power provided by the Ostwalt section and below the Wollaston section of Tscherning's ellipse for the desired range of focal powers. The nominal front surface power may thus exceed the Ostwalt section by at least a first predetermined threshold of, for example, 1 D or 2 D and stay below the Wollaston section of Tscherning's ellipse by at least a second predetermined threshold of, for example, 1 D or 2 D. In this context, Tscherning's ellipse can be derived from the corrected von Rohr equation (after Morgan) solved for point-focal (zero astigmatism) distance vision. It shall be understood that the term determining a spectacle lens refers to (individually) designing a prescription lens for a user or selecting a (finished) stock lens.

In a first step S101, eyeglass prescription data of an eye of a user is obtained, the prescription data comprising a focal power of the eye of the user. The prescription data may also comprise position of wear information of the user such as tilt, wrap, and/or back vertex distance. This enables the (freeform) back surface to be further optimized for the user. For a stock lens, the prescription data can indicate the desired focal power that the stock lens shall provide.

In a second step S102 it is determined whether the focal power belongs to an upper first range of focal powers, wherein lenses having same nominal front surface power are provided; or to a lower second range of focal powers, wherein lenses having same minimum nominal back surface power are provided. For this purpose, a function as for example shown by the series S1 in FIG. 2 that links focal powers to an upper range 11 of focal powers and a lower range of focal powers can be used. Such a function can be provided as a look-up table in a storage medium or processing unit. It is thus decided as indicated by block S103 whether the focal power belongs to the upper first range or the lower second range.

In step S104, if the focal power belongs to the upper range, the (same) nominal front surface power is selected and the nominal back surface power is determined such that the spherical front surface in conjunction with the back surface of the lenses provides the focal power.

Alternatively, in step S105, if the focal power belongs to a lower range, the (same) minimum nominal back surface power is selected and the nominal front surface power is determined such that the spherical front surface in conjunction with the back surface of the lens provides the focal power.

In an optional further step S106, the spectacle lens is manufactured according to the aforementioned lens design. Thereby, a method for manufacturing a spectacle lens is provided.

Figure 8:
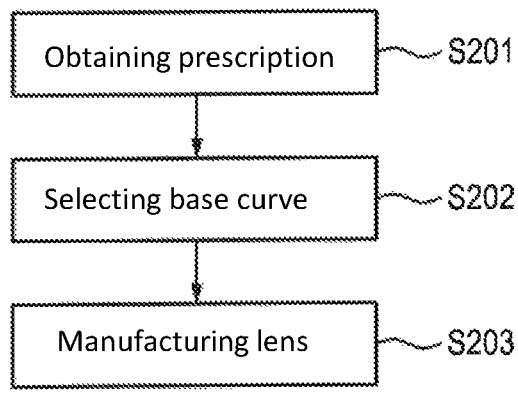
FIG. 8 shows a schematic flow chart of a further method according to an aspect of the present disclosure.

Referring now to FIG. 8, a more abstract description of the underlying concept is provided wherein an in a first step S201 eyeglass prescription data of an eye of a user is obtained, the prescription data comprising a focal power. Based thereon, in step S202, the base curve for the nominal front surface power is selected as the steepest curve which is (a) compatible with existing frames under the boundary condition that (b) the back surface is not too steep to be cut and polished with existing freeform generators. The spherical nominal front surface power is determined such that the spherical front surface in conjunction with the back surface of the lens provides the desired focal power. Based on this lens design, a spectacle lens can be manufactured in a further optional manufacturing step S203.

Figure 9:
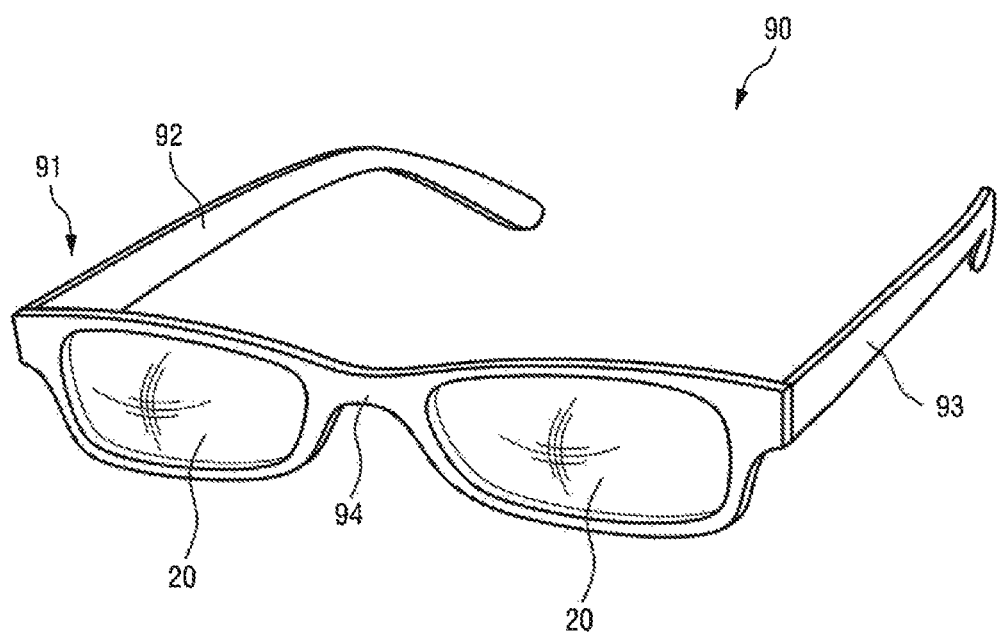
FIG. 9 shows eyeglasses according to a further aspect of the disclosure.

FIG. 9 shows eyeglasses 90 according to a further aspect of the present disclosure comprising left and right spectacle lenses 20 selected from a series of spectacle lenses S1 as described above and an eyeglass frame 91 including left and right temple pieces 92, 93 and a nose bridge 94 for supporting the spectacle lenses on the face of a wearer.

In conclusion, a reduced distortion series of lenses is provided that enables a high base curve design philosophy while at the same time providing improved manufacturability. Current conventional lens designs tend to use the flattest practical base curve for a given focal power primarily for aesthetic reasons and to reduce the weight of the lens. However, those lenses may suffer from high levels of distortion. The design suggested in the afore-mentioned U.S. Pat. No. 6,142,624 used ideal but very steep base curves producing lenses with very low distortion but required unconventional manufacturing processes, had limited focal power coverage and required special frames. The solution proposed herein, however, may advantageously enable the use of spherical semi-finished lens blanks compatible with conventional frames along with an aspheric, atoric, or freeform back surface produced by existing freeform generators. Hence, a reduced distortion lens is provided which can have reduced distortion without increasing the blur or cost.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, in particular a non-transitory storage medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The foregoing description of the exemplary embodiments of the disclosure illustrates and describes the present invention. Additionally, the disclosure shows and describes only the exemplary embodiments, but, as mentioned above, it is to be understood that the invention is capable of being used in various other combinations, modifications, and environments and is capable of changes or modifications within the scope of the concept as expressed herein, commensurate with the above teachings and/or the skill or knowledge of the relevant art.

All publications, patents, and patent applications cited in this specification are herein incorporated by reference, and for any and all purposes, as if each individual publication, patent, or patent application were specifically and individually indicated to be incorporated by reference. In the case of inconsistencies, the present disclosure will prevail.

The invention claimed is:

1. A method for determining or designing a prescription spectacle lens, the prescription spectacle lens having a spherical front surface and an aspheric, atoric, or freeform back surface, wherein the spherical front surface in conjunction with the back surface of the prescription spectacle lens is configured to provide a focal power $P_x$ between −0.75 D and +2.25 D; the spherical front surface having a nominal front surface power $P_f$ and the back surface having a minimum nominal back surface power $P_b$, and wherein 15.5 D≤|$P_f$|+|$P_b$|+|$P_x$|≤31.5 D; the method comprising:

providing a series of tangible spectacle lenses, each spectacle lens from the series of tangible spectacle lenses belonging either to a lower range of focal powers between −0.75 D up to a threshold or an upper range of focal powers between the threshold and +2.25 D;

obtaining eyeglass prescription data of an eye of a user, the eyeglass prescription data including a focal power $P_x$;

determining whether the focal power $P_x$ belongs to the upper range of focal powers, wherein spectacle lenses having a same nominal front surface power $P_f$ are provided; or to the lower range of focal powers, wherein spectacle lenses having a same minimum nominal back surface power are provided;

selecting the nominal front surface power $P_f$ and determining the nominal back surface power $P_b$ such that the spherical front surface in conjunction with the back surface of the prescription spectacle lens provides the focal power if the focal power belongs to the upper range, or selecting the minimum nominal back surface power $P_b$ and determining the nominal front surface power $P_f$ such that the spherical front surface in conjunction with the back surface of the prescription spectacle lens provides the focal power if the focal power belongs to the lower range; and selecting one spectacle lens from the series of tangible spectacle lenses as the prescription spectacle lens.

2. The method according to claim 1, wherein the nominal front surface power $P_f$ in the upper range of focal powers corresponds to a maximum nominal front surface power.

3. The method according claim 1, wherein the minimum nominal back surface power $P_b$ of the lower range corresponds to a minimum nominal back surface power.

4. The method according to claim 1, wherein the threshold corresponds to a sum of the nominal front surface power of the upper range and the minimum nominal back surface power of the lower range.

5. The method according to claim 1, wherein the threshold is between −0.75 D to +1 D.

6. A computer program product stored on a non-transitory storage medium and comprising program code for causing a computer to carry out the method as claimed in claim 1 when the computer program is carried out on a computer or a processing unit.

7. A method for manufacturing a prescription spectacle lens according to a lens design, the prescription spectacle lens having a spherical front surface and an aspheric, atoric, or freeform back surface, wherein the spherical front surface in conjunction with the back surface of the lens is adapted to provide a focal power $P_x$ between −0.75 D and +2.25 D; the spherical front surface having a nominal front surface power $P_f$ and the back surface having a minimum nominal back surface power $P_b$, and wherein $15.5\ D \leq |P_f| + |P_b| + |P_x| \leq 31.5\ D$, the method comprising:

- providing a series of tangible spectacle lenses, each spectacle lens from the series of tangible spectacle lenses belonging either to a lower range of focal powers between −0.75 D up to a threshold or an upper range of focal powers between the threshold and +2.25 D;
- obtaining eyeglass prescription data of an eye of a user, the prescription data comprising a focal power $P_x$;
- determining whether the focal power $P_x$ belongs to the upper range of focal powers, wherein spectacle lenses having a same nominal front surface power $P_f$ are provided; or to the lower range of focal powers, wherein spectacle lenses having a same minimum nominal back surface power are provided;
- selecting the nominal front surface power $P_f$ and determining the nominal back surface power $P_b$ such that the spherical front surface in conjunction with the back surface of the prescription spectacle lens provides the focal power if the focal power belongs to the upper range, or
- selecting the minimum nominal back surface power $P_b$ and determining the nominal front surface power $P_f$ such that the spherical front surface in conjunction with the back surface of the prescription spectacle lens provides the focal power if the focal power belongs to the lower range; and
- manufacturing the prescription spectacle lens according to the lens design.

* * * * *